(12) United States Patent
Ohue et al.

(10) Patent No.: US 7,450,201 B2
(45) Date of Patent: Nov. 11, 2008

(54) LIQUID CRYSTAL DISPLAY DEVICE AND METHOD FOR FABRICATION THEREOF

(75) Inventors: Makoto Ohue, Ikoma (JP); Takeshi Ishida, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 217 days.

(21) Appl. No.: 11/145,225

(22) Filed: Jun. 6, 2005

(65) Prior Publication Data

US 2005/0275776 A1 Dec. 15, 2005

(30) Foreign Application Priority Data

Jun. 14, 2004 (JP) ............................. 2004-175362
Feb. 22, 2005 (JP) ............................. 2005-044972

(51) Int. Cl.
*G02F 1/1333* (2006.01)
*G02F 1/1335* (2006.01)

(52) U.S. Cl. ...................... 349/114; 349/106; 349/107

(58) Field of Classification Search ................. 349/106, 349/114, 107
See application file for complete search history.

(56) References Cited

U.S. PATENT DOCUMENTS

| | | | |
|---|---|---|---|
| 6,008,877 A * | 12/1999 | Akiyama et al. | ............ 349/147 |
| 6,195,140 B1 | 2/2001 | Kubo et al. | |
| 6,215,538 B1 | 4/2001 | Narutaki et al. | |
| 6,757,038 B2 * | 6/2004 | Itoh et al. | .................... 349/113 |
| 2002/0018881 A1 * | 2/2002 | Terashita et al. | ............ 428/209 |
| 2003/0133059 A1 * | 7/2003 | Wei et al. | ..................... 349/113 |
| 2003/0156240 A1 | 8/2003 | Oda et al. | |
| 2003/0202138 A1 | 10/2003 | Nakamura | |
| 2004/0056999 A1 * | 3/2004 | Ko et al. | ..................... 349/114 |

FOREIGN PATENT DOCUMENTS

| | | | |
|---|---|---|---|
| JP | 10-039334 | * | 2/1998 |
| JP | 2000-162625 | | 6/2000 |
| JP | 2004-219515 | | 4/2004 |
| JP | 2004-252047 | | 9/2004 |

* cited by examiner

*Primary Examiner*—David Nelms
*Assistant Examiner*—Lauren Nguyen
(74) *Attorney, Agent, or Firm*—Nixon & Vanderhye P.C.

(57) ABSTRACT

A liquid crystal display device 1 has liquid crystal 6 sealed between a pixel substrate 4, having a pixel electrode 10 composed of a reflective electrode 42 that reflects light and a transparent electrode 41 that transmits light, and a opposed substrate 5 having a opposed electrode 23 located opposite the pixel electrode 10. The liquid crystal display device 1 displays an image while being illuminated by light reflected from the reflective electrode 42 or with light transmitted through the transparent electrode 41. The pixel substrate 4 has a coloring layer 43, which is formed on top of the reflective electrode 42 to add a color to light and has an opening 43a above the reflective electrode 42, and a multiple-gap portion 44, which is formed continuously on top of the coloring layer 43 and in the opening 43a and narrows the thickness of the liquid crystal 6 above the reflective electrode 42. The transparent electrode 41 is laid on the multiple-gap portion 44 and the coloring layer 43. The transparent electrode 41 and the reflective electrode 42 conduct to each other through a contact hole 44a formed in the multiple-gap portion 44, inside the rim of the opening 43a.

5 Claims, 8 Drawing Sheets

LIQUID CRYSTAL DISPLAY DEVICE AND METHOD FOR FABRICATION THEREOF

This nonprovisional application claims priority under 35 U.S.C. § 119(a) on Patent Applications Nos. 2004-175362 and 2005-044972 filed in Japan on Jun. 14, 2004 and Feb. 22, 2005, respectively, the entire contents of which are hereby incorporated by reference.

BACKGROUND OF THE INVENTION

1. Field of the Invention

The present invention relates to a liquid crystal display device that has reflective and transparent electrodes and that is illuminated with transmitted and reflected light, and to a method for fabricating such a liquid crystal display device.

2. Description of Related Art

Thin and power-saving, liquid crystal display devices find wide application in office automation equipment such as personal computers, in personal digital assistant equipment such as electronic personal organizers and cellular phones, and in other equipment such as VCRs incorporating a camera. Liquid crystal display devices are classified into a transmissive type, which uses as pixel electrodes a transparent conductive film such as one formed of ITO, and a reflective type, which uses as pixel electrodes reflective electrodes such as those formed of a metal.

Transmissive liquid crystal display devices provide display while being illuminated with a backlight. This advantageously permits bright, high-contrast display, but disadvantageously results in high electric power consumption. By contrast, reflective liquid crystal display devices are illuminated with ambient light, and thus do not require a backlight. This advantageously contributes to low electric power consumption, but disadvantageously leads to low contrast depending on ambient brightness. For these reasons, semi-transmissive liquid crystal display devices have come into practical use that can be illuminated both with reflected ambient light and with the light from a backlight.

Figure 21:
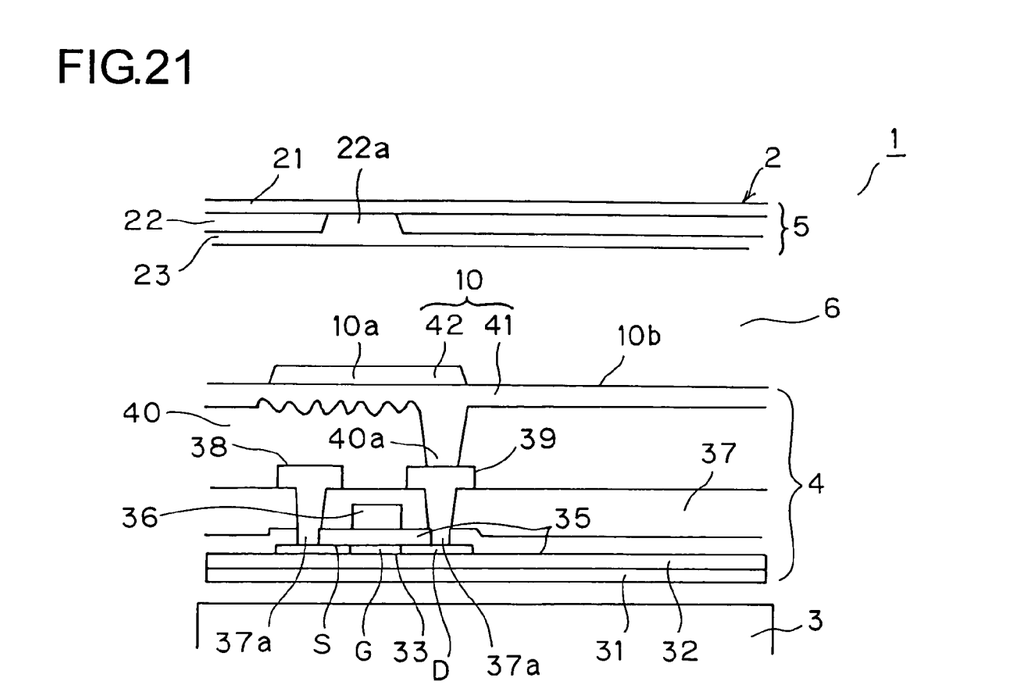
FIG. 21 is a sectional view showing a conventional liquid crystal display device.

Japanese Patent Application Laid-open No. 2000-111902 discloses a semi-transmissive liquid crystal display device. FIG. 21 is a sectional view of this liquid crystal display device. The liquid crystal display device 1 has a backlight 3 provided on the back side of a display panel 2. The display panel 2 has liquid crystal 6 sealed between a pixel substrate 4 and a opposed substrate 5. The pixel substrate 4 has a base coat film 32 formed on a glass substrate 31.

On the base coat film 32 is formed a semiconductor layer 33, which functions as a TFT element having a gate G, a source S, and a drain D. On top of the semiconductor layer 33 is formed a gate insulation film 35, and further on the gate insulation film 35 is formed a gate electrode 36. On the gate electrode 36 is formed an interlayer insulation film 37. A source electrode 38 and a drain electrode 39 are formed so as to conduct to the source S and the drain D, respectively, through contact holes 37a formed in the interlayer insulation film 37.

On the interlayer insulation film 37 is formed a transparent resin layer 40, and further on the transparent resin layer 40 is formed a transparent electrode 41. The transparent electrode 41 is formed of, for example, ITO, and conducts to the drain electrode 39 through a contact hole 40a formed in the transparent resin layer 40. In a predetermined place on the transparent electrode 41, a reflective electrode 42 is formed that is formed of, for example, aluminum. The transparent electrode 41 and the reflective electrode 42 together form a pixel electrode 10. In the entire liquid crystal display device 1, a large number of pixel electrodes 10 are arrayed in a matrix. The pixel electrode 10 thus has a reflective portion 10a, which is formed by the reflective electrode 42, and a transmissive portion 10b, which is formed by the portion of the transparent electrode 41 lying elsewhere than in the reflective portion 10a.

The opposed substrate 5 has a coloring layer 22 formed on a glass substrate 21. The coloring layer 22 functions as a color filter for adding a color to light. On top of the coloring layer 22 is formed a opposed electrode 23 formed of, for example, ITO. On the transparent electrode 41 and the opposed electrode 23 are formed alignment films (not illustrated) for aligning the liquid crystal 6.

In the liquid crystal display device 1 structured as described above, when the backlight 3 is lit, the light emitted from the backlight 3 travels through the transmissive portion 10b and illuminates the display panel 2. When the backlight 3 is off, ambient light enters the display panel 2, and is then reflected on the reflective portion 10a to illuminate the display panel 2. In this way, the displayed image is made comfortably visible. The coloring layer 22 has, in the part thereof opposite the reflective portion 10a, an opening 22a. The opening 22a helps obtain sufficient brightness when illumination is achieved by reflection.

The conventional liquid crystal display device 1 described above, however, has the following disadvantages. As increasingly high-resolution display panels 2 are used, when the glass substrates 21 and 31 contract under the influence of the heat and membrane stress to which they are exposed during the fabrication process, it has been becoming increasingly difficult to accurately position the pixel electrode 10 formed on the pixel substrate 4 relative to the coloring layer 22 formed on the opposed substrate 5. This lowers the aperture ratio and the yield of the liquid crystal display device 1.

SUMMARY OF THE INVENTION

An object of the present invention is to provide a liquid crystal display device that is ready for a higher resolution in combination with an enhanced aperture ratio and an enhanced yield, and to a method for fabricating such a liquid crystal display device.

To achieve the above object, in one aspect of the present invention, in a liquid crystal display device that includes a pixel substrate having a pixel electrode composed of a reflective electrode that reflects light and a transparent electrode that transmits light, a opposed substrate having a opposed electrode disposed opposite the pixel electrode, and liquid crystal sealed between the pixel substrate and the opposed substrate, and that displays an image while being illuminated with light reflected from the reflective electrode or with light transmitted through the transparent electrode, the pixel substrate is provided with a coloring layer formed on top of the reflective electrode to add a color to light and having an opening formed above the reflective electrode, a multiple-gap portion formed continuously on top of the coloring layer and in the opening, the multiple-gap portion narrowing the thickness of the liquid crystal above the reflective electrode, and a contact hole formed in the multiple-gap portion inside the rim of the opening, the contact hole permitting the transparent electrode laid in the multiple-gap portion and on the coloring layer and the reflective electrode to conduct to each other.

In another aspect of the present invention, a method for fabricating a liquid crystal display device that includes a pixel substrate having a pixel electrode composed of a reflective electrode that reflects light and a transparent electrode that transmits light, a opposed substrate having a opposed electrode disposed opposite the pixel electrode, and liquid crystal sealed between the pixel substrate and the opposed substrate, and that displays an image while being illuminated with light reflected from the reflective electrode or with light transmitted through the transparent electrode includes a reflective electrode formation step for forming the reflective electrode on the pixel substrate, a coloring layer formation step for forming a coloring layer, for adding a color to light, on top of the reflective electrode, with an opening formed above the reflective electrode, a multiple-gap portion formation step for forming a multiple-gap portion, for narrowing the thickness of the liquid crystal above the reflective electrode, continuously on top of the coloring layer and in the opening, and a transparent electrode formation step for forming the transparent electrode on top of the multiple-gap portion and the coloring layer.

Here, in the multiple-gap portion formation step, a contact hole formed in the multiple-gap portion inside the rim of the opening and permitting the transparent electrode and the reflective electrode to conduct to each other is formed together with the multiple-gap portion.

DETAILED DESCRIPTION OF PREFERRED EMBODIMENTS

Figure 1:
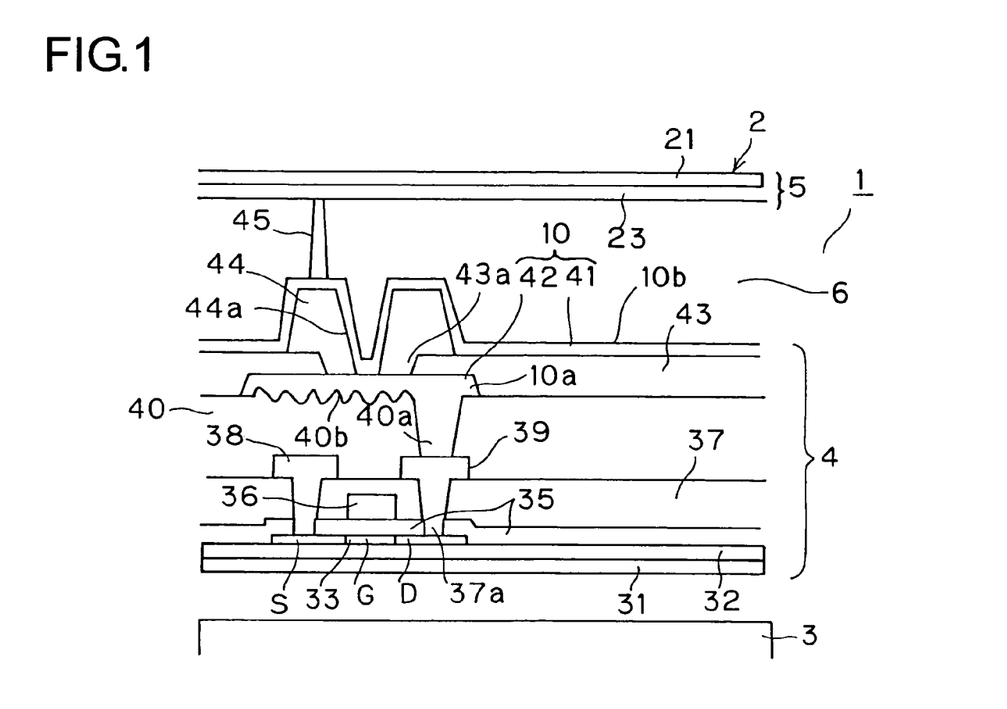
FIG. 1 is a sectional view showing a liquid crystal display device according to the invention.
Figure 2:
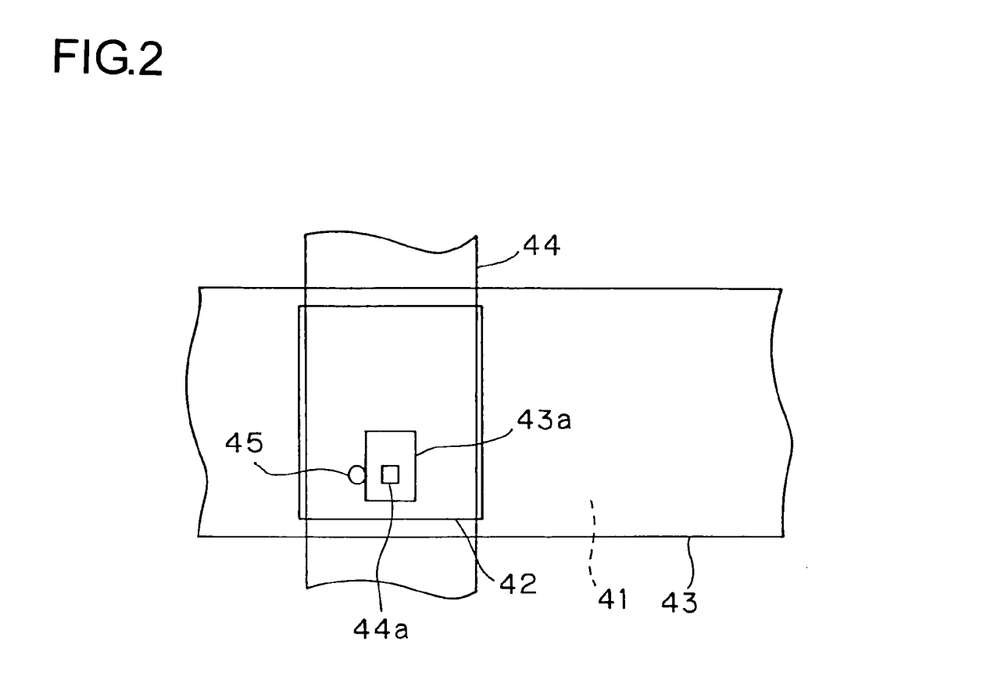
FIG. 2 is a plan view showing a liquid crystal display device according to the invention.

Hereinafter, embodiments of the present invention will be described with reference to the drawings. FIGS. 1 and 2 are a side sectional view and a plan view, respectively, showing a principal portion of a liquid crystal display device according to the invention. For the sake of convenience, such portions as find their counterparts in the conventional example shown in FIG. 21 described earlier are identified with common reference numerals and symbols. The liquid crystal display device 1 has a backlight 3 provided on the back side of a display panel 2. The display panel 2 has liquid crystal 6 sealed between a pixel substrate 4 and a opposed substrate 5. The pixel substrate 4 has a base coat film 32 formed on a glass substrate 31 formed of, for example, borosilicate glass.

On the base coat film 32 is formed a semiconductor layer 33, which functions as a TFT element having a gate G, a source S, and a drain D. On top of the semiconductor layer 33 is formed a gate insulation film 35, and further on top of the gate insulation film 35 is formed a gate electrode 36. On the gate electrode 36 is formed a interlayer insulation film 37. Contact holes 37a are formed in the interlayer insulation film 37, and a source electrode 38 and a drain electrode 39 are formed so as to conduct to the source S and the drain D, respectively, through the contact holes 37a.

On the interlayer insulation film 37 is formed a transparent resin layer 40, and, in a predetermined place on the transparent resin layer 40, a reflective electrode 42 is formed. The part of the transparent resin layer 40 lying in contact with the bottom side of the reflective electrode 42 is formed into a bumpy portion 40b having fine surface irregularities. This permits light to be scattered within a predetermined range of angles, and thus permits efficient use of ambient light.

The reflective electrode 42 is formed of a light-reflecting conductive material, for example aluminum, and conducts to the drain electrode 39 through a contact hole 40a formed in the transparent resin layer 40. On top of the reflective electrode 42 is formed a coloring layer 43. The coloring layer 43 is formed of a photosensitive colorant resin, and serves as a color filter for adding a color to light. The coloring layer 43 has an opening 43a formed therein right above the reflective electrode 42. The opening 43a helps obtain sufficient brightness when illumination is achieved by reflection.

On top of the coloring layer 43 is formed a multiple-gap portion 44 that is formed of resin and is formed so as to cover the reflective electrode 42 from above. The multiple-gap portion 44 is formed continuously on top of the coloring layer 43 and in the opening 43a. On top of the multiple-gap portion 44 is formed a transparent electrode 41 so as to cover the multiple-gap portion 44 and the coloring layer 43. The transparent electrode 41 is formed of, for example, ITO or IZO, and conducts to the reflective electrode 42 through a contact hole 44a formed in the multiple-gap portion 44. The contact hole 44a is formed inside the rim of the opening 43a in the coloring layer 43, and the side wall of the contact hole 44a is formed by the multiple-gap portion 44.

The transparent electrode 41 and the reflective electrode 42 together form a pixel electrode 10. In the entire liquid crystal display device 1, a large number of pixel electrodes 10 are arrayed in a matrix. The pixel electrode 10 thus has a reflective portion 10a, which is formed by the reflective electrode 42, and a transmissive portion 10b, which is formed by the portion of the transparent electrode 41 lying elsewhere than in the reflective portion 10a. The multiple-gap portion 44 serves to narrow the thickness of the liquid crystal 6 as measured above the reflective portion 10a to about one half of that measured above the transmissive portion 10b. This makes equal the optical path length traveled by the light passing through the liquid crystal 6 between in the reflective portion 10a and in the transmissive portion 10b, and thus helps reduce the optical loss suffered by the light reflected from the reflective portion 10a.

On top of the multiple-gap portion 44 is formed a photo-spacer 45. The photo-spacer 45 serves to make uniform among individual pixels the thickness of the liquid crystal 6 as measured above the reflective portion 10a.

The opposed substrate 5 has an opposed electrode 23, formed of, for example, ITO or IZO, formed on a glass substrate 21 formed of, for example, borosilicate glass. On the transparent electrode 41 and the opposed electrode 23 are formed alignment films (not illustrated) for aligning the liquid crystal 6.

Figure 3:
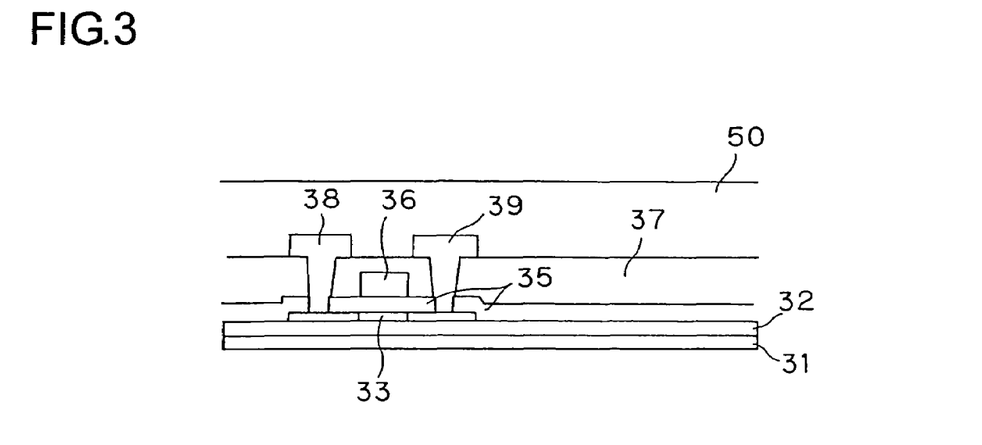
FIG. 3 is a sectional view showing the transparent resin layer formation step in a process for fabricating a liquid crystal display device according to the invention.
Figure 4:
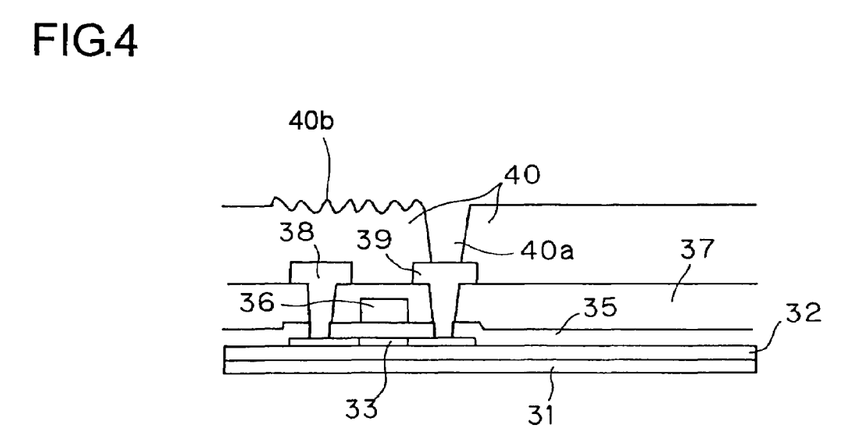
FIG. 4 is a sectional view showing the transparent resin layer formation step in a process for fabricating a liquid crystal display device according to the invention.

Next, the process for fabricating the pixel substrate 4 will be described with reference to FIGS. 3 to 16. It should be noted that the steps for forming the layers below the transparent resin layer 40 are the same as those conventionally performed and thus will not be discussed below. FIGS. 3 and 4 show the transparent resin layer formation step for forming the transparent resin layer 40. As shown in FIG. 3, on top of the source electrode 38, the drain electrode 39, and the interlayer insulation film 37, transparent resin 50 formed of an insulating material is applied so as to have a thickness of 1 to 3 μm, preferably 2 μm. Then, as shown in FIG. 4, the contact hole 40a and the bumpy portion 40b are formed by photolithography.

Figure 5:
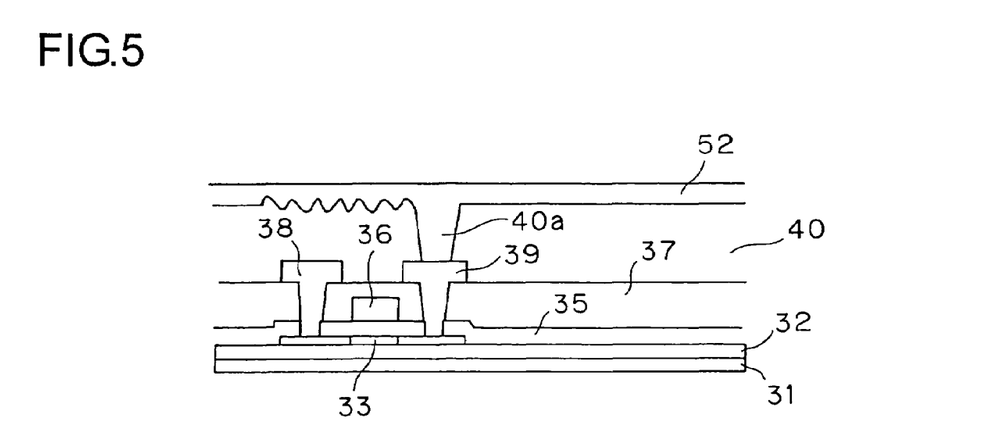
FIG. 5 is a sectional view showing the reflective electrode formation step in a process for fabricating a liquid crystal display device according to the invention.
Figure 6:
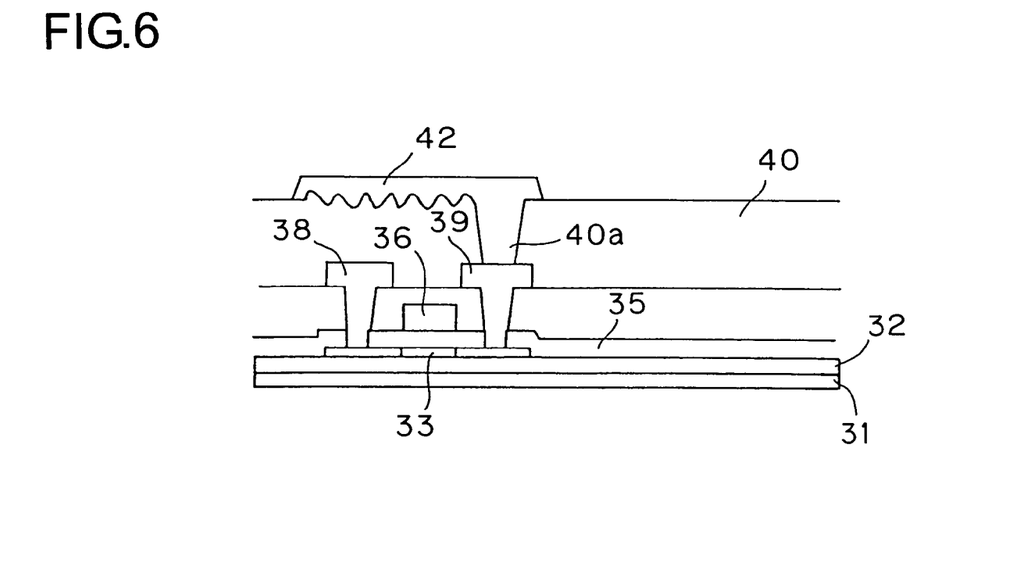
FIG. 6 is a sectional view showing the reflective electrode formation step in a process for fabricating a liquid crystal display device according to the invention.

FIGS. 5 and 6 show the reflective electrode formation step for forming the reflective electrode 42. As shown in FIG. 5, on the transparent resin layer 40, a conductive film 52 formed of a conductive material, for example aluminum, is laid by sputtering. On the conductive film 52, resist is applied so that a resist pattern with a desired shape is formed by photolithography. Subsequently, by wet etching or dry etching, the conductive film 52 is removed in regions where it is unnecessary. In this way, the reflective electrode 42 is formed as shown in FIG. 6.

Figure 7:
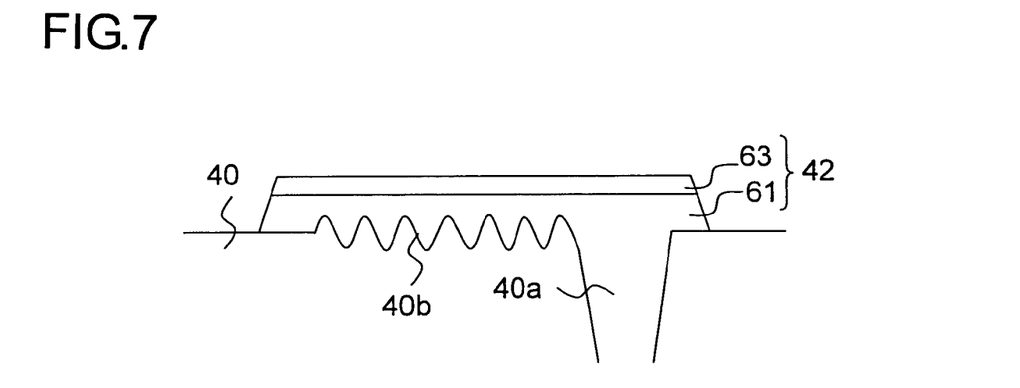
FIG. 7 is a sectional view showing the details of the reflective electrode of a liquid crystal display device according to the invention.

The reflective electrode 42 may be formed as multiple-layer films of which the lowest layer is formed of IZO. When formed as a single-layer film of, for example, aluminum, the conductive film 52 exhibits poor adhesion with the transparent resin layer 40 lying immediately below it. This causes the reflective electrode 42 to exfoliate, increasing the incidence of bad contact between the reflective electrode 42 and the drain electrode 39. By contrast, when the reflective electrode 42 is formed as multiple-layer films including an IZO film 61 as the lowest layer and an aluminum film 63 as the upper layer as shown in FIG. 7, the high adhesion between the IZO film 61 and the transparent resin layer 40 prevents exfoliation.

Experiments were conducted to compare the rate of defects due to bad contact between in a case where the reflective electrode 42 was formed as a single-layer film of aluminum and in a case where it was formed as multiple-layer films including an IZO film 61 and an aluminum film 63. While the defect rate with the single-layer film was 85% at the maximum, the defect rate with an IZO film 61 in the lowest layer was 0%. This shows that forming an IZO film 61 as the lowest layer helps prevent bad contact and thereby increase the yield of the liquid crystal display device.

Figure 8:
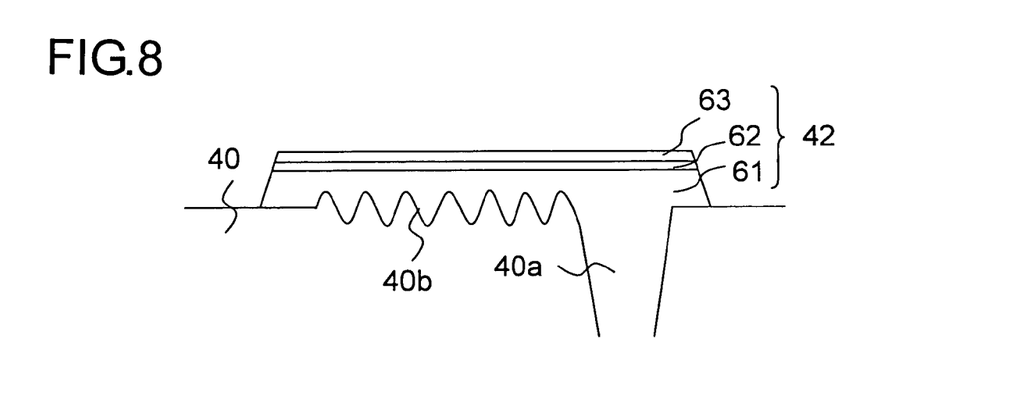
FIG. 8 is a sectional view showing the details of another example of the reflective electrode of a liquid crystal display device according to the invention.
Figure 9:
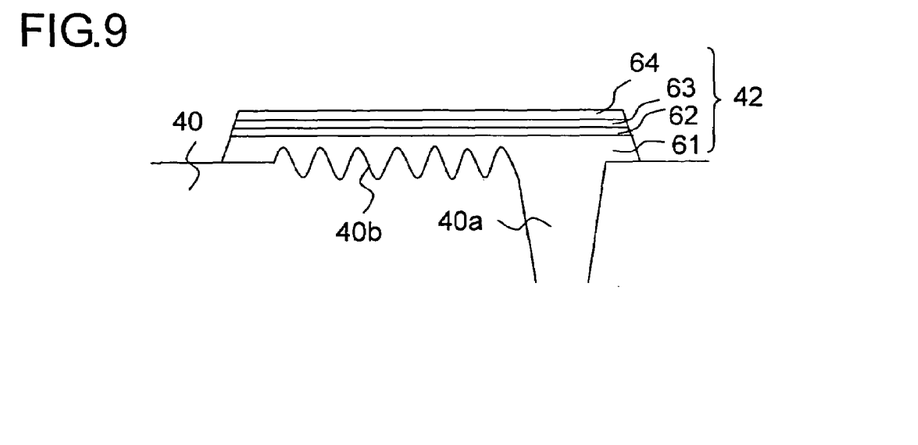
FIG. 9 is a sectional view showing the details of still another example of the reflective electrode of a liquid crystal display device according to the invention.

Alternatively, as shown in FIG. 8, the reflective electrode 42 may be formed as three-layer films composed of, from bottom, an IZO film 61, a molybdenum film 62, and an aluminum film 63. This too helps prevent bad contact. In this three-layer films, the aluminum film 63 may be replaced with another IZO film as the highest layer. Alternatively, as shown in FIG. 9, the reflective electrode 42 may be formed as four-layer films composed of, from bottom, an IZO film 61, a molybdenum film 62, an aluminum film 63, and an IZO film 64. This too helps prevent bad contact. It is preferable to form an IZO film 64 as the highest layer, because the IZO film 64 then protects the conductive film 52 from the developer fluid used in the coloring layer formation step described later.

Figure 10:
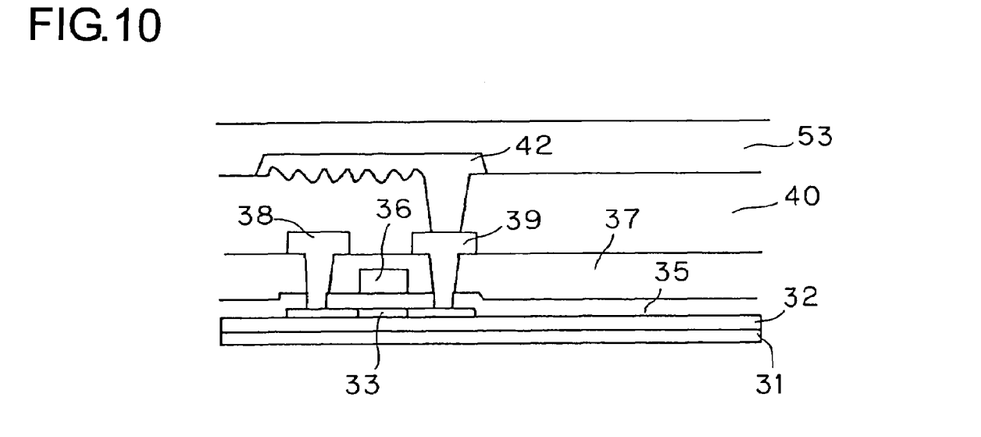
FIG. 10 is a sectional view showing the coloring layer formation step in a process for fabricating a liquid crystal display device according to the invention.
Figure 11:
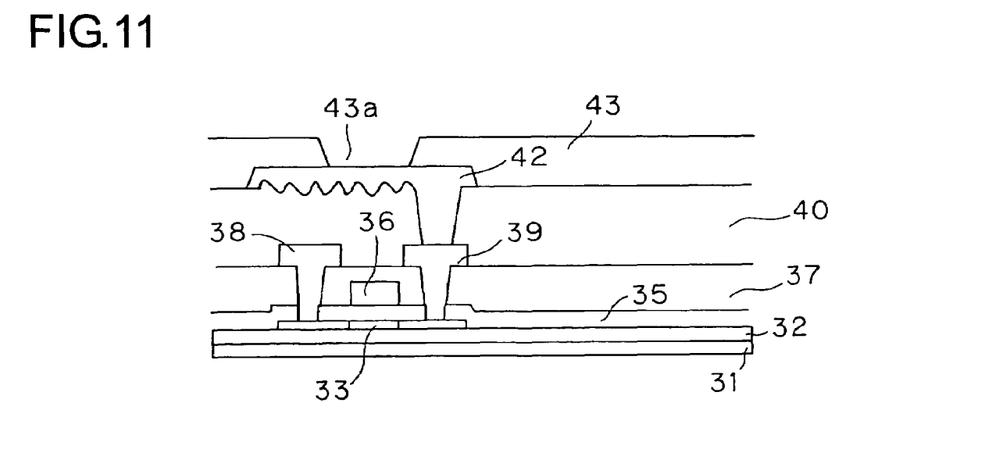
FIG. 11 is a sectional view showing the coloring layer formation step in a process for fabricating a liquid crystal display device according to the invention.

FIGS. 10 and 11 show the coloring layer formation step for forming the coloring layer 43. As shown in FIG. 10, on the reflective electrode 42 and the transparent resin layer 40, a photosensitive resin composition having a pigment dispersed therein is applied or otherwise laid to form a photosensitive colorant resin film 53. The photosensitive colorant resin film 53 is formed to have a thickness of 1 to 3 μm, preferably about 1.5 μm.

Then, as shown in FIG. 11, the photosensitive colorant resin film 53 is patterned into a desired shape, and in this way the coloring layer 43 is formed. Simultaneously, the opening 43a is formed above the reflective electrode 42. Varying the aperture area of the opening 43a results in varying the lightness and color saturation of the reflective portion 10a (see FIG. 1), and therefore the aperture area is determined to suit how the liquid crystal display device 1 is used.

Figure 12:
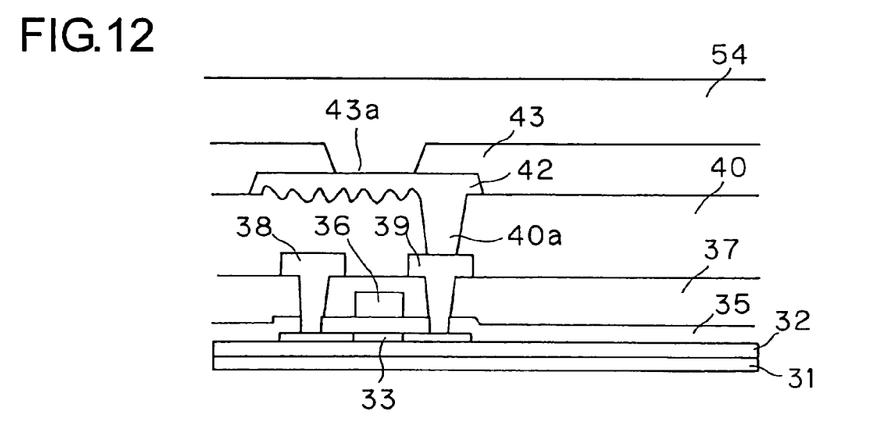
FIG. 12 is a sectional view showing the multiple-gap portion formation step in a process for fabricating a liquid crystal display device according to the invention.
Figure 13:
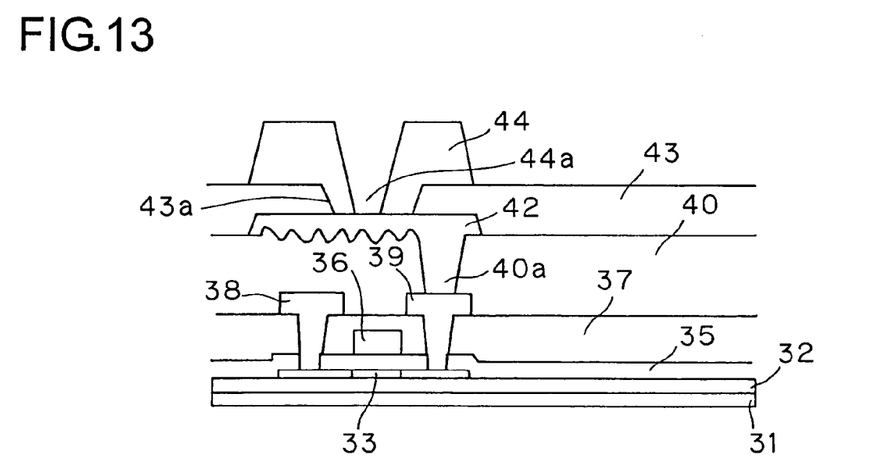
FIG. 13 is a sectional view showing the multiple-gap portion formation step in a process for fabricating a liquid crystal display device according to the invention.

FIGS. 12 and 13 show the multiple-gap portion formation step for forming the multiple-gap portion 44. As shown in FIG. 12, on the coloring layer 43, transparent resin 54 formed of an insulating material is applied or otherwise laid. The transparent resin 54 is given a thickness about one half of the thickness of the liquid crystal 6 (see FIG. 1). Here, the transparent resin 54 is formed so as to fill, continuously from on top of the coloring layer 43, the opening 43a and thus lie on the reflective electrode 42.

Then, as shown in FIG. 13, by photolithography, the multiple-gap portion 44 is formed in a desired shape. Simultaneously, the contact hole 44a is formed in the transparent resin 54 inside the opening 43a. Forming the multiple-gap portion 44 on top of the coloring layer 43 permits the contact hole 44a to be formed simultaneously with the multiple-gap portion 44, and thus helps reduce the number of fabrication steps.

Figure 17:
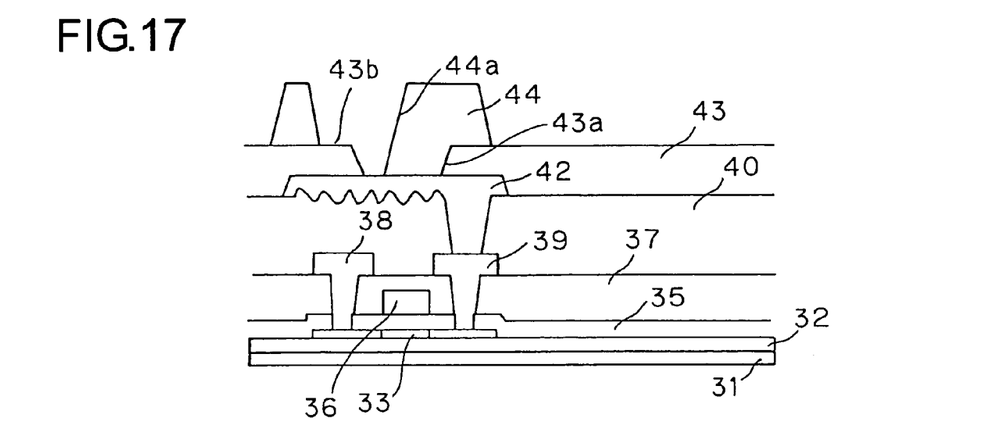
FIG. 17 is a diagram illustrating advantages of a liquid crystal display device according to the invention.

As shown in FIG. 17, if the contact hole 44a is formed in a place deviated from the opening 43a, a flat portion 43b of the coloring layer 43 appears in the contact hole 44a. Above the flat portion 43b, the liquid crystal 6 is thicker, and thus the optical path length to the reflective portion 10a is longer. This results in an increased optical loss, giving the liquid crystal display device 1 a reduced aperture ratio when illumination is achieved by reflection.

Forming the contact hole 44a elsewhere than where the opening 43a is located requires an extra step, after the multiple-gap portion 44 is formed, for forming the contact hole 44a to penetrate the coloring layer 43. This increases the number of fabrication steps.

The contact hole that penetrates the coloring layer 43 and the multiple-gap portion 44 may develop diameter discontinuity. Specifically, when the coloring layer 43 is penetrated, a variation in the development speed may make the hole diameter at the lower end of the multiple-gap portion 44 smaller (see FIG. 18) or greater (see FIG. 19) than the hole diameter at the upper end of the coloring layer 43.

Figure 18:
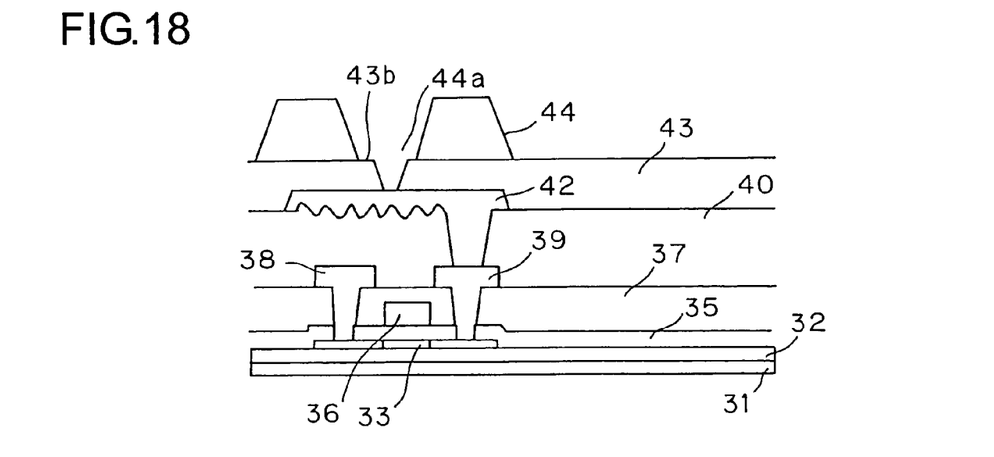
FIG. 18 is a diagram illustrating advantages of a liquid crystal display device according to the invention.
Figure 19:
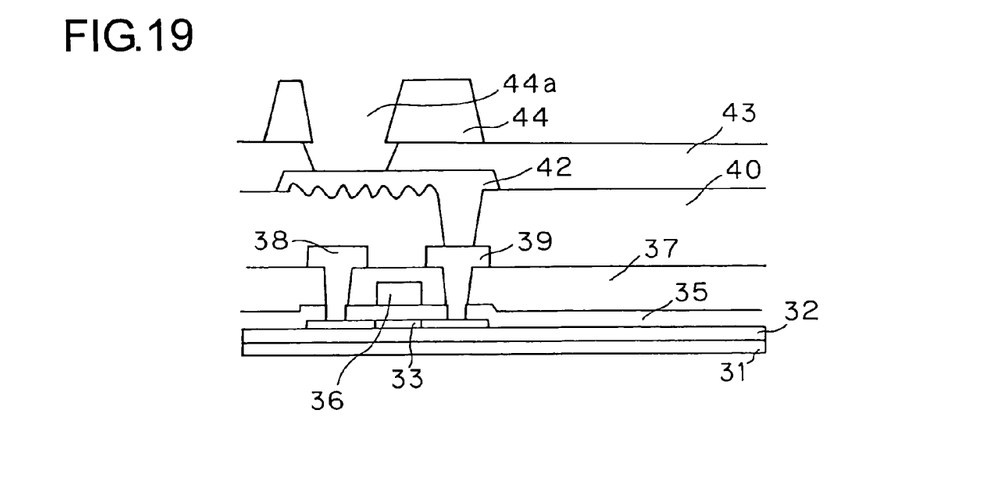
FIG. 19 is a diagram illustrating advantages of a liquid crystal display device according to the invention.

If the hole diameter of the contact hole at the upper end of the coloring layer 43 is smaller as shown in FIG. 18, just as in the case shown in FIG. 17, a flat portion 43b of the coloring layer 43 appears, giving the liquid crystal display device 1 a lower aperture ratio. If the hole diameter at the upper end of the coloring layer 43 is greater as shown in FIG. 19, poor conduction may result in the transparent electrode 41 formed in the contact hole 44a in the succeeding step, lowering the yield of the liquid crystal display device 1. Hence, forming the contact hole 44a inside the rim of the opening 43a contributes to a reduced number of fabrication steps, an enhanced yield, and an enhanced aperture ratio.

Figure 14:
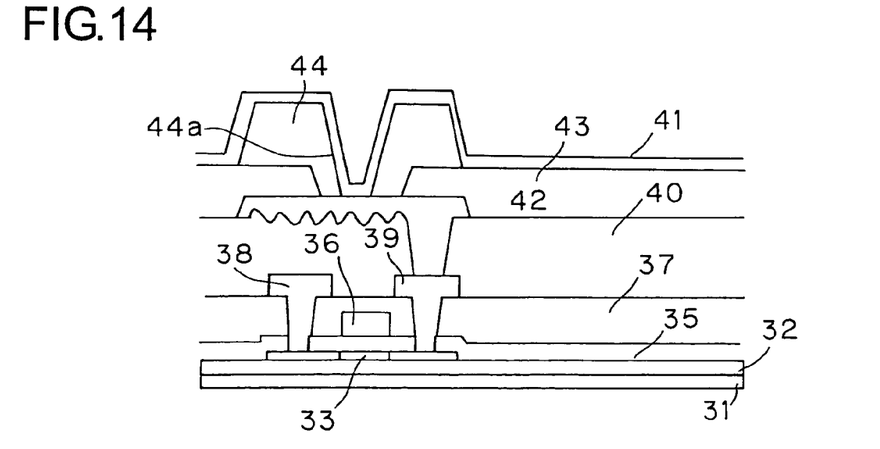
FIG. 14 is a sectional view showing the transparent electrode formation step in a process for fabricating a liquid crystal display device according to the invention.

FIG. 14 shows the transparent electrode formation step for forming the transparent electrode 41. On the multiple-gap portion 44 and the coloring layer 43, a transparent conductive film formed of, for example, ITO or IZO, is laid by sputtering. On the conductive film, resist is applied to form a resist pattern with a desired shape. Then, by wet etching or dry etching, the conductive film is removed in regions where it is unnecessary. In this way, the transparent electrode 41 is formed.

Laid on top of the coloring layer 43 and the multiple-gap portion 44, the transparent electrode 41 covers them and thereby prevents the liquid crystal 6 from deteriorating.

Figure 15:
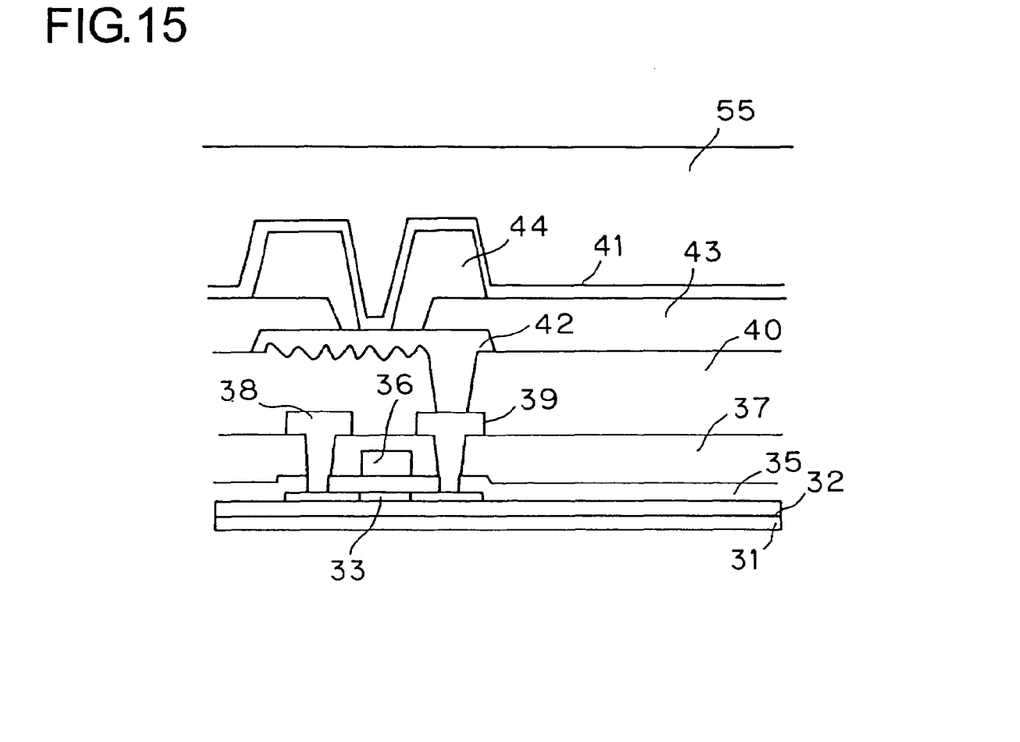
FIG. 15 is a sectional view showing the photo-spacer formation step in a process for fabricating a liquid crystal display device according to the invention.
Figure 16:
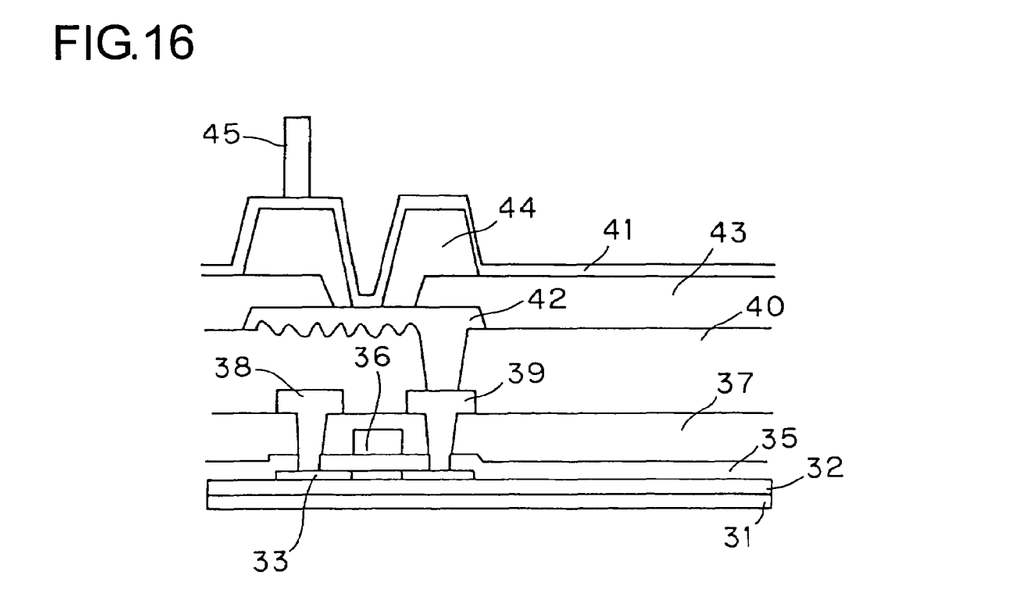
FIG. 16 is a sectional view showing the transparent electrode formation step in a process for fabricating a liquid crystal display device according to the invention.

FIGS. 15 and 16 show the photo-spacer formation step for forming the photo-spacer 45. As shown in FIG. 15, on the transparent electrode 41, transparent resin 55 is applied. As shown in FIG. 16, the transparent resin 55 is then formed into a desired pattern by photolithography, and in this way the photo-spacer 45 is formed on the multiple-gap portion 44. This makes the thickness of the liquid crystal 6 in the reflective portion 10a (see FIG. 1) uniform.

In the liquid crystal display device 1 structured as described above, in each pixel, when the semiconductor element 33 performs switching so that a voltage is applied between the pixel electrode 10 and the opposed electrode 23, an image signal is written to the liquid crystal 6. When the backlight 3 is on, the light emitted therefrom passes through the transmissive portion 10b and illuminates the display panel 2. When the backlight 3 is off, ambient light enters the display panel 2 and is then reflected from the reflective portion 10a to illuminate the display panel 2. In this way, the displayed image is made comfortably visible.

In this embodiment, laying the coloring layer 43 on the pixel substrate 4 helps prevent the aperture ratio and the yield of the liquid crystal display device 1 from lowering as a result of the pixel substrate 4 and the opposed substrate 5 being inaccurately positioned relative to each other, and thus helps achieve a higher resolution in the liquid crystal display device 1. Moreover, the multiple-gap portion 44 is laid continuously on top of the coloring layer 43 and in the opening 43a, and the contact hole 44a is formed inside the rim of the opening 43a. This permits the contact hole 44a to be formed simultaneously when the multiple-gap portion 44 is formed. Moreover, the contact hole 44a does not develop diameter discontinuity between the coloring layer 43 and the multiple-gap portion 44.

Thus, it is possible to reduce the number of fabrication steps and prevent poor conduction and thereby achieve an enhanced yield; it is also possible to obtain higher brightness and a higher aperture ratio when illumination is achieved by reflection. If the opening 43a and the contact hole 44a are formed in different places, even when they are given the smallest formable areas, their total area is too great to leave a sufficiently large coloring area at a higher resolution. Thus, locating the contact hole 44a in the opening 43a helps prevent the lowering of color saturation when illumination is achieved by reflection.

Figure 20:
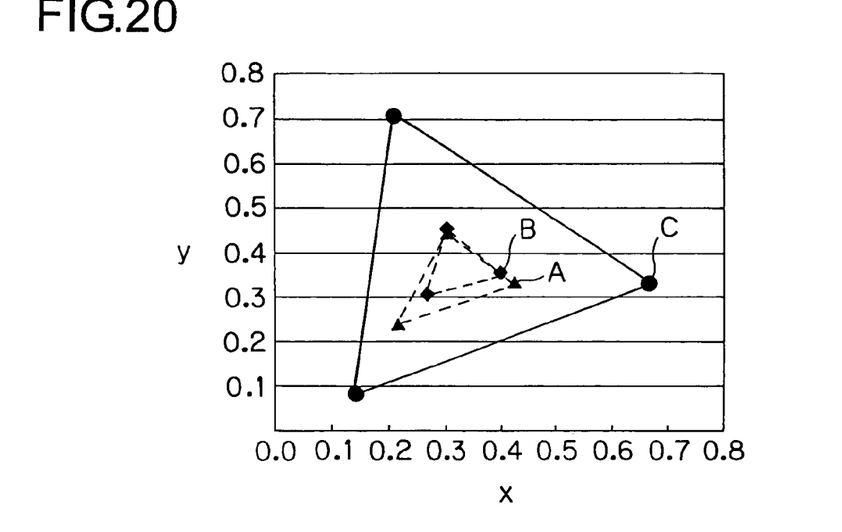
FIG. 20 is a chromaticity diagram of a liquid crystal display device according to the invention.

With this structure, the aperture ratio of the reflective portion 10a of the display panel 2 when illumination was achieved by reflection was 14%, up from 10% observed in the conventional example shown in FIG. 21 described earlier. FIG. 20 is a chromaticity diagram showing the results of chromaticity measurement conducted with the liquid crystal display device 1 of this embodiment with illumination performed by reflection. In the figure, "A" indicates the chromaticity observed in this embodiment, "B" indicates the chromaticity observed in the conventional example shown in FIG. 21, and "C" indicates the chromaticity of NTSC signals. As will be clear from the figure, this embodiment, as compared with the conventional example, offers an enhanced aperture ratio, resulting in enhanced brightness and color saturation.

What is claimed is:

1. A liquid crystal display device comprising:
   a pixel substrate having a pixel electrode composed of a reflective electrode that reflects light and a transparent electrode that transmits light;
   a opposed substrate having a opposed electrode disposed opposite the pixel electrode; and
   liquid crystal sealed between the pixel substrate and the opposed substrate,
   the liquid crystal display device displaying an image while being illuminated with light reflected from the reflective electrode or with light transmitted through the transparent electrode,
   wherein the pixel substrate comprises:
   a coloring layer formed on top of the reflective electrode to add a color to light and having an opening formed above the reflective electrode to obtain sufficient brightness;
   a multiple-gap portion formed of resin, the multiple-gap portion being formed continuously on top of the coloring layer and in the opening, the multiple-gap portion narrowing a thickness of the liquid crystal above the reflective electrode to about half a thickness of the liquid crystal above the transparent electrode; and
   a contact hole formed in the multiple-gap portion inside a rim of the opening, the contact hole permitting the transparent electrode laid in the multiple-gap portion and on the coloring layer and the reflective electrode to conduct to each other.

2. The liquid crystal display device of claim 1, wherein the coloring layer and the multiple-gap portion are formed of resin.

3. The liquid crystal display device of claim 1, wherein a transparent resin layer is laid under the reflective electrode, and the reflective electrode is composed of multiple-layer films including an IZO film laid in contact with the transparent resin layer.

4. A method for fabricating a liquid crystal display device comprising:
 a pixel substrate having a pixel electrode composed of a reflective electrode that reflects light and a transparent electrode that transmits light;
 a opposed substrate having a opposed electrode disposed opposite the pixel electrode; and
 liquid crystal sealed between the pixel substrate and the opposed substrate,
 the liquid crystal display device displaying an image while being illuminated with light reflected from the reflective electrode or with light transmitted through the transparent electrode,
 the method comprising:
 a reflective electrode formation step for forming the reflective electrode on the pixel substrate;
 a coloring layer formation step for forming a coloring layer, for adding a color to light, on top of the reflective electrode, with an opening formed above the reflective electrode to obtain sufficient brightness;
 a multiple-gap portion formation step for forming a multiple-gap portion out of resin, for narrowing a thickness of the liquid crystal above the reflective electrode to about half a thickness of the liquid crystal above the transparent electrode, continuously on top of the coloring layer and in the opening; and
 a transparent electrode formation step for forming the transparent electrode on top of the multiple-gap portion and the coloring layer,
 wherein, in the multiple-gap portion formation step, a contact hole formed in the multiple-gap portion inside a rim of the opening and permitting the transparent electrode and the reflective electrode to conduct to each other is formed together with the multiple-gap portion.

5. The method of claim 4, wherein a transparent resin layer is laid under the reflective electrode, and the reflective electrode is composed of multiple-layer films including an IZO film laid in contact with the transparent resin layer.

* * * * *